(12) United States Patent
Davis et al.

(10) Patent No.: US 7,407,110 B2
(45) Date of Patent: Aug. 5, 2008

(54) PROTECTION OF NON-PROMISCUOUS DATA IN AN RFID TRANSPONDER

(75) Inventors: Michael L. Davis, Amherst, NY (US); Tam Hulusi, Santa Ana, CA (US)

(73) Assignee: Assa Abloy AB, Stockholm (SE)

( * ) Notice: Subject to any disclaimer, the term of this patent is extended or adjusted under 35 U.S.C. 154(b) by 93 days.

(21) Appl. No.: 11/464,267

(22) Filed: Aug. 14, 2006

(65) Prior Publication Data

US 2007/0034686 A1 Feb. 15, 2007

Related U.S. Application Data

(60) Provisional application No. 60/708,530, filed on Aug. 15, 2005.

(51) Int. Cl.
*G06K 7/10* (2006.01)
(52) U.S. Cl. .......... 235/472.02; 235/492; 235/451; 340/572.1; 711/163; 711/164
(58) Field of Classification Search .......... 235/487, 235/472.02, 492; 340/572.01, 5.2, 10.51, 340/5.8, 572.1; 711/163–164
See application file for complete search history.

(56) References Cited

U.S. PATENT DOCUMENTS

| 5,499,017 | A | * | 3/1996 | Beigel ............... 340/572.1 |
| 5,764,138 | A | | 6/1998 | Lowe |
| 5,832,090 | A | * | 11/1998 | Raspotnik ............... 705/66 |
| 6,476,708 | B1 | | 11/2002 | Johnson |
| 6,566,997 | B1 | | 5/2003 | Bradin |
| 6,650,227 | B1 | | 11/2003 | Bradin |
| 7,009,517 | B2 | * | 3/2006 | Wood ............... 340/572.1 |
| 7,108,177 | B2 | * | 9/2006 | Brookner ............... 235/382 |
| 2002/0170973 | A1 | * | 11/2002 | Teraura ............... 235/492 |
| 2005/0236479 | A1 | * | 10/2005 | Schmidtberg et al. ....... 235/384 |
| 2007/0034691 | A1 | | 2/2007 | Davis et al. |

FOREIGN PATENT DOCUMENTS

| EP | 1460573 | 9/2004 |
| WO | WO 03/817087 | 10/2003 |

OTHER PUBLICATIONS

Weis et al, Security and Privacy Aspects of Low-Cost Radio Frequency Identification Systems, Lecture Notes in Computer Science, Springer Verlag, Berlin, DE, vol. 2802, Jan. 2004, 12 pages.

(Continued)

*Primary Examiner*—Uyen-Chau N. Le
*Assistant Examiner*—Tuyen K Vo
(74) *Attorney, Agent, or Firm*—Sheridan Ross P.C.

(57) ABSTRACT

A radio frequency identification device (RFID) and method for authenticating RFIDs are disclosed. In RFIDs, data is stored in a form of data segments selectively associated with promiscuous and non-promiscuous regions of their memories. A randomly selected portion of a content of a non-promiscuous region is examined by an interrogating readers or a host computer after validating the data contained in a promiscuous region.

65 Claims, 4 Drawing Sheets

OTHER PUBLICATIONS

European Search Report for European Application No. 06 11 9042, Dec. 21, 2006, 2 pages.
European Written Opinion for European Application No. 06 11 9042, Dec. 21, 2006, 5 pages.
Lu, Card Convenience, Security Examined, The Tech, Feb. 2, 1996, pp. 12-17, vol. 116, No. 0.
Committee Report, Prox Card Committee, retrieved from http://proxcard.csail.mit.edu/moin.cgi/Committee_20Report_20_2d_20June_202004 on Apr. 30, 2005, 2 pages, Jun. 2004.
CSAIL Prox Card Privacy Committee, Jul. 7, 2004 Status Report, retrieved from http://proxcard.csail.mit.edu/learnmore on Apr. 30, 2005, 5 pages, Jul. 7, 2004.
He, Issues Raised About Building 32 Security, The Tech, Apr. 2, 2004, 3 pages, vol. 124, No. 16.
Agrawal et al., The MIT Card System: Analysis and Recommendations, retrieved from http://swiss.csail.mit.edu/6805/student-papers/fall04-papers/mit_id/ on Apr. 30, 2005, 59 pages, Dec. 10, 2004.
Mandel et al., MIT Proximity Card Vulnerabilities, CSAIL Radio Society, 2004, 22 pages.
Baker, Authentication Comments, retrieved from http://jis.mit.edu/pipermail/saag/2005q1.txt on Apr. 21, 2005, Jan. 8, 2005, 4 pages.
Replay Attacks Newsgroup Listing, RFID Tags and XOR, Google Groups, retrieved from http://groups.google.com/group/sci.crypt/browse_t...94b/5a9623e60aa72a76?q=rfid+replay+attack&mum=1&hl=en on Apr. 21, 2005, Jun. 1, 2004, 12 pages.
Housley, Emails Related to "Auto, Gas Security Chips Vulnerable, Study Finds", retrieved from http://jis.mit.edu/pipermail/saag/2005q1.txt on Apr. 21, 2005, Jan. 29, 2005, 10 pages, Washington.
Juels et al., Client Puzzles-A Cryptographic Countermeasure Against Connection Depletion Attacks, RSA Laboratories, Proceedings of NDSS '99 (Networks and Distributed Security Systems), pp. 151-165, 1999.
Decker et al., eSeal-A System for Enhanced Electronic Assertion of Authenticity and Integrity, Pervasive 2004. International conference No. 2, Linz, Apr. 18, 2004, vol. 3001, pp. 254-268.
Shamir, How to Share A Secret, MIT, Communications of the ACM, Nov. 1979, 2 pages, vol. 12, No. 11.
El-Chammas et al., Implementing Security in RFID Systems, The "Tag Emulator", American University of Beirut, May 2004, 4 pages.
Datta, RFID an Incomplete Story, MIT Forum for Supply Chain Innovation, 2001, 37 pages.
Waters et al., New Client Puzzle Outsourcing Techniques for DoS Resistance, CCS, Oct. 25-29, 2004, 11 pages, Washington, D.C.
Open Security Exchange Best Practices, Guidelines for Selection and Issuance of Identification Tokens for Logical and Physical Systems, 2004, 54 pages.
Molnar et al., Privacy and Security in Library RFID Issues, Practices, and Architectures, CCS, Oct. 25-29, 2004, 10 pages, Washington D.C.
Gragg, Radio Frequency Identification, Technical and Societal Issues, Ohio State University, Dec. 10, 2003, 27 pages.
Inoue et al., RFID Privacy Using User-Controlled Uniqueness, System LSI Research Center, Kyushu University, 2003, 17 pages.
Avoine et al., RFID Traceability: A Multilayer Problem, The 9th International Conference on Financial Cryptography, Feb. 28-Mar. 3, 2005, 15 pages.
Krawczyk, Secret Sharing Made Short, Advances in Cryptography, Crypto '93, LNCS 773, 1994, pp. 136-146.
Weis, Security and Privacy in RFID Devices, MIT, May 9, 2003, 79 pages.
Smith et al., Sensor Enhanced Authentication Token for Dynamic Identity Management, HP Laboratories, HPL-2004-226, Dec. 21, 2004, 14 pages.
Krishna et al., Simple Lightweight RFID Reader Protocol, Reva Systems, Mar. 2005, 79 pages.
Anderson et al., Tamper Resistance—A Cautionary Note, USENIX Association in The Second USENIX Workshop on Electronic Commerce Proceedings, Oakland, California, Nov. 18-21, 1996, pp. 1-11.
Brainard et al., A New Two-Server Approach for Authentication with Short Secrets, RSA Laboratories, In V. Paxson, ed., USENIX Security '03, pp. 201-214. 2003.
EP Examination Report for EP 06119042.7 dated Nov. 14, 2007.
EP Search Report and Written Opinion for EP 06119045.0 dated Dec. 7, 2006.
EP Examination Report for EP 06119045.0, dated Oct. 29, 2007.

* cited by examiner

PROTECTION OF NON-PROMISCUOUS DATA IN AN RFID TRANSPONDER

CROSS-REFERENCE TO RELATED APPLICATIONS

This application claims the benefit of U.S. provisional patent application Ser. No. 60/708,530 filed Aug. 15, 2005. Cross-reference is made to U.S. patent application Ser. No. 11/464,280, filed Aug. 14, 2006, entitled "Using Promiscuous and Non-Promiscuous Data to Verify Card and Reader Identity", which are both incorporated herein by reference.

FIELD OF THE INVENTION

Embodiments of the present invention generally relate to a field of radio frequency information acquisition technologies and, in particular, to radio frequency identification devices and methods for authenticating such devices.

BACKGROUND OF THE INVENTION

Radio frequency (RF) identification systems use contactless information acquisition technologies to identify objects at a distance and out of a line of sight. Such systems generally comprise RF transponders ("radio frequency identification" (RFID) devices, RF interrogators ("readers") of the RFID devices, and a controller with a computerized database. The RFID devices typically are incorporated in credit card-like plastic enclosures (e.g., smart cards, ID/access cards, and the like) or directly attached, in a form of RF tags, to the products being monitored or packages thereof. In operation, the RFID device is presented to a reader that reads data from the RFID device, transmits the data to a controller or host system, where a decision is made to grant or deny access to an asset, such as a secure location or some sort of device like a computer. The controller may be centralized and communicate with a plurality of readers or it may be localized and associated with a single reader. The latter is referred to as a stand-alone reader.

In the present state-of-the-art, cards contain data that is promiscuously transmitted when it is excited by being in close proximity to the reader. The data is transmitted from the first memory location in the card and continues with the next sequential memory location until a preprogrammed upper limit is reached. This process repeats continuously restarting at the first memory location after the upper limit has been reached until the card is removed from the reader's RF field. The reader receives and stores multiple continuous transmissions and looks for a synchronization sentinel indicating where the data begins. It then makes sure that a minimum number of identical instances of the data are present to insure that there have been no data reception errors. The data is then formatted and transmitted via a communications port to an upstream device for processing and interpretation of the data. As previously noted, the upstream device may be a remote controller, such as a control panel or host computer, or it may be localized with the reader.

A format is a container for the data that defines its content and size. The supplier and user of the access control system chooses which format is the most suitable based upon the desired data content as well as considerations for security of the data. Due to historical and legacy considerations, the number of bits utilized in formats typically range from 26 to 40 bits, although persons of skill in the art will recognize that the number of bits may exceed 40. Formats that are popular, such as the "26-bit Wiegand format" are less secure than formats that contain a larger number of data bits due to the fact that with a relatively few number of bits, the possibility of finding identical cards in a large world-wide card population for a given format is statistically very likely.

In one specific application, the RFID devices are used in automated security systems providing controlled access to (or exit from) areas, such as offices, public or commercial buildings, and the like. In this and similar applications, integrity of an automated security system may be compromised by attackers eavesdropping RF communications between the RFID device and the reader and cloning a legitimate RFID device, as well as electronically or otherwise tampering with the reader or replacing the reader with a fraudulent device.

RFID cards have become a very mature, reliable, convenient, and popular technology and, as a result, a large installed base of older cards and readers exists (legacy cards and readers). Adding or updating security in older systems such as these can be difficult, expensive, and time consuming. What used to be state of the art security technology twenty or even ten years ago is becoming outdated and less secure.

Conventional systems have several weaknesses that can be exploited since no authentication of the card is performed. Such weaknesses include, substitution of a legitimate reader with an unauthorized reader, substitution of a bona-fide card with a clone, reading a card programmed by an illicit source, and reading a card programmed by an unscrupulous or even low cost supplier that does not have the same quality and security measures therein. Additionally, RFID cards that promiscuously emit unchanging or static data are subject to replay attacks in which a device pretends to be a legitimate reader in order to acquire the promiscuous data. An attacker only needs to read the RFID cards of a passerby or simply borrow a legitimate user's card to harvest data from it for later re-use.

While there is a constant trend of increased sophistication in attempts to compromise the security systems, the high cost of replacing a network of existing readers with more advanced RF interrogators may delay the response to detected and anticipated security threats or violations. Such existing readers or systems may be referred to as legacy readers or systems. They typically are not state of the art in their functionality and features.

Ultimately, legacy readers, systems, cards, and protocols need to be replaced or updated with newer more secure identification and/or security systems. As noted above, this transition can be a very expensive process, especially when a large installed base of legacy readers and cards exists. For example, in the event that a large entity wishes to update their security system, immediate replacement of thousands of readers and security credentials would be impossible. Even if the transition were performed over the course of a week, that week would provide a window where potential attackers could gain unauthorized access to previously secured assets. There are also other entities that do not wish to completely update their entire security systems at once. These entities require a technology that can work according to both the old legacy system protocols and the new system protocols.

There is also a threat that older attacking methods may be used to gain illicit access to assets in an updated system. Both fully updated systems and partially updated systems are still susceptible to the old methods employed by attackers to gain access or information from security systems. For example, attackers may attempt to use older legacy readers in order to recover promiscuously transmitted information from genuine access cards. The promiscuous data may be stolen from a legacy card and placed on an illicit card or portable electronic emulation device. An attacker then only has to present the illicit card to a remote reader that has not been updated and the reader cannot tell the difference between the illicit card and the genuine card because each contains the same data. Also, attackers may attempt to replace or bypass the new reader with a legacy reader by tapping into the communication lines between the reader and the controller.

Therefore, there is a need in the art for an improved system and method for authenticating the RFID devices and validating the readers of the RFID devices, especially during, or after completion of, an upgrade of technology in identification systems.

SUMMARY

The present invention generally is a RFID and method for authenticating RFIDs, such as ID/access cards, smart cards, RF tags, cellular phones, Personal Digital Assistants (PDAs), and the like. The invention may be used in various applications utilizing RF information acquisition technologies for identifying a holder (individual or object) of the RFID.

In one embodiment, an RFID is provided comprising a memory having promiscuous and non-promiscuous regions where at least one of configuration data, authenticating data, or holder data is stored in a form of data segments. Data stored in a promiscuous region ("promiscuous data") is transmitted to an interrogating reader when the RFID is placed in an active zone of the reader, whereas a content of the data segment(s) stored in a non-promiscuous region ("non-promiscuous data") is selectively transmitted to the reader upon a specific request initiated by the reader ("challenge"). Generation and execution of the request for non-promiscuous authentication data typically requires successful decoding and validation of the authentication data contained in the promiscuous region of the memory. Of course, authentication of the promiscuous data does not necessarily have to occur. Rather the reading of the promiscuous data may be viewed as a "handshake" prior to the issuance of challenges to the RFID. After this process has occurred, challenges are presented to the RFID and the RFID must authenticate itself by correctly responding to the challenge by transmitting the appropriate non-promiscuous shared-secret data segments. Only after the authenticity of the card is determined will the data be transmitted to the upstream device. In accordance with one embodiment, the reader and/or host computer uses the challenge/response protocol to authenticate the non-promiscuous data stored on the RFID.

As used herein, "configuration data" is any data that is related to the configuration of, or communication protocol between, the RFID and/or the reader. For example, configuration data can include data that tells the card what type of information should be transmitted back to the reader when queried by a reader. Additionally, configuration data may include information that relates to the number of memory spaces available and their respective size on a given RFID. Furthermore, the configuration data may also indicate how many of those memory spaces contain data and what portion of memory they are associated with (e.g., promiscuous or non-promiscuous). Configuration data may also be related to the number of allowable bits per message that can be sent in a given transmission. The configuration data may be general, in which case it can be stored in the promiscuous region of the memory. However, if portions of the configuration data are not general, those portions are stored in the non-promiscuous region of the memory.

In contrast, "shared-secret data" or "shared-secrets" are data that is specifically required by at least one reader to verify the authenticity of the RFID device. It is data that is known by both the RFID device and the reading device. Shared-secret data may include card identification numbers, passwords, keys, encryption/decryption schemes, cryptograms, rolling codes, hashes, and the like. Since shared-secret data is typically unique, it is stored on the non-promiscuous data region.

As used herein, "holder data" is data that relates to the holder, or intended holder, of the RFID. Examples of holder data include name, birth date, social security numbers, title, position held in the company, employee badge number, and the like.

In another embodiment, there is provided a method for authenticating the RFIDs having memories comprising promiscuous and non-promiscuous regions. The RFID is positively authenticated when the promiscuous data and a randomly selected portion of the non-promiscuous data match the records stored in the interrogating reader and/or a host computer of the reader. In one embodiment, the non-promiscuous data is retrieved from the RFID by the reader issuing a "challenge" for non-promiscuous data. As used herein, a "challenge" is understood as a request to retrieve data from one or more random non-promiscuous memory locations in which the authenticity of the data at the location is authenticated (e.g., a cryptogram, etc.).

In yet another embodiment, there is provided a system including a plurality of RFIDs having memories comprising promiscuous and non-promiscuous regions, a plurality of readers of the RFIDs, and a host computer coupled to the readers and containing a database of records associated with the RFIDs and the readers.

In still another embodiment, the RFIDs can be either legacy RFIDs with only a promiscuous memory region, RFIDs with only a non-promiscuous memory region, or RFIDs with both promiscuous and non-promiscuous memory regions. The system further includes a plurality of readers of the RFIDs that are capable of reading any type of the provided RFID, and a host computer coupled to the readers containing a database of records associated with the RFIDs and readers. Specifically, the system allows for backwards compatibility of a new reader with both a legacy RFID containing only promiscuous data and a new more secure RFID containing promiscuous data, non-promiscuous data, or a combination of the two. Furthermore, the new RFIDs containing both promiscuous data and non-promiscuous data are compatible with both legacy readers that only verify promiscuous data and newer more secure readers that authenticate the non-promiscuous data of the RFIDs using a challenge/response protocol.

In a further embodiment, the reader may verify at least a portion of the non-promiscuous data from the newer RFIDs after it has verified the authentication data stored in the promiscuous region of the newer RFID. However, for the legacy RFIDs, the reader will either allow the holder of the legacy RFID access to the asset if only promiscuous data is required to gain access. Of course, if non-promiscuous data is also required to gain access, the reader will not allow the holder of the legacy RFID access to the asset. Rather, on a holder of the newer RFID will be able to gain access to the asset.

In embodiments utilizing a "smart card" configuration, the memory of the RFID device may further comprise credential data. Credential data, i.e., promiscuous, non-promiscuous, and/or secured (not reader accessible) data, may be used by the RFID device to perform authentication functions that are typically performed by a host computer. Essentially, the credential data may relate to what assets the particular RFID device has access to and at what times the RFID device (or holder of the RFID device) may access those assets. In operation, the RFID device may be presented to a reader that relays back to the RFID device information relating to an asset associated with that reader and what time it is. While authenticating itself, the RFID device compares the asset and/or, if appropriate, the time information received from the reader with the credential data stored in its memory to determine if it has access rights to the given asset and, if appropriate, at the current time. If the RFID device does have access rights to that particular asset then the RFID device verifies its validity to the reader by emitting a valid signal. The valid signal may prompt to the reader to release the asset, which it was previously securing. For example, the reader may unlock a door, open a door, turn on a computer, etc. If the RFID device does not have access rights to that particular asset then the RFID device does not verify its validity to the reader and no further actions are taken or an invalid signal is sent to the reader. The invalid signal may prompt the reader to indicate to the holder of the RFID device that access is not permitted by, for example, flashing a light, emitting a sound, or creating some other type of message.

The Summary is neither intended or should it be construed as being representative of the full extent and scope of the present invention. The present invention is set forth in various levels of detail and the Summary as well as in the attached drawings and in the detailed description of the invention and no limitation as to the scope of the present invention is intended by either the inclusion or non inclusion of elements, components, etc. in the Summary. Additional aspects of the present invention will become more readily apparent from the detailed description, particularly when taken together with the appended drawings.

BRIEF DESCRIPTION OF THE DRAWINGS

The teachings of the present invention will become apparent by considering the following detailed description in conjunction with the accompanying drawings, in which.

To facilitate understanding, identical reference numerals are used, where possible, to designate identical elements that are common to the figures. The images in the drawings are simplified for illustrative purposes and are not depicted to scale.

The appended drawings illustrate exemplary embodiments of the invention and, as such, should not be considered as limiting the scope of the invention that may admit to other equally effective embodiments.

DETAILED DESCRIPTION

The present invention generally is a radio frequency identification device (RFID) and method for authenticating RFIDs, such as ID/access cards, smart cards, RF tags, and the like. The invention advantageously addresses deficiencies of the prior art and may be utilized within the context of security systems, as well as be equally efficiently utilized in a broad range of other applications using interactive computerized data acquisition techniques, both contactless or requiring a physical contact with a carrier of pre-programmed information (e.g., monitoring moving objects, tracking inventory, verifying credit cards, and the like).

Figure 1:
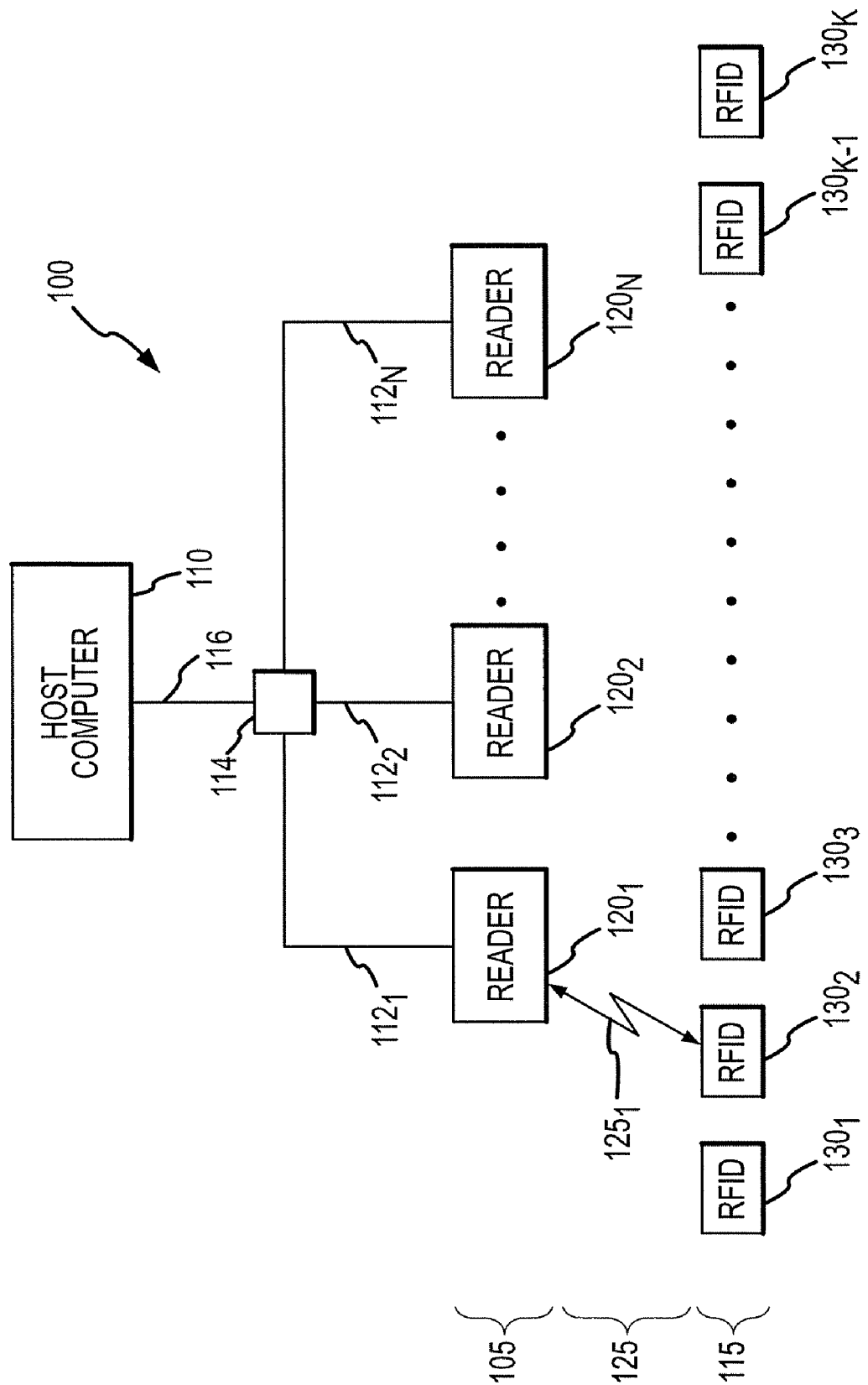
FIG. 1 depicts a high-level, schematic diagram of an exemplary system for authenticating RFIDs of the kind that may be used to practice portions of the invention.

FIG. 1 depicts a high-level, schematic diagram of an exemplary system 100 for authenticating RFIDs of the kind that may be used to practice portions of the invention. Hereafter, similar apparatuses, devices and interfaces are identified using the same numeric references, except that suffixes may be added, when appropriate, to differentiate such apparatuses, devices, and interfaces.

In one embodiment, the system 100 comprises a host computer 110, a plurality 115 of K RFIDs 130, and a plurality 105 of N readers 120 of the RFIDs 130. As used herein, N and K are integers wherein $N \geq 1$, $K \geq 1$, and typically K>N. The plurality of readers 105 may include readers 120 of the same type, as well as readers of different types or readers having different computing and/or interrogating capabilities. In the depicted embodiment, the readers 120 are coupled to the host computer 110 via an optional interconnecting hub 114. In an alternate embodiment (not shown), the readers 120 may directly be coupled to the respective inputs/outputs of the host computer 110. Interfaces 112 and 116 between the readers 120, the hub 114, and the host computer 110 are generally bi-directional interfaces, which may selectively be implemented in a form of wired, wireless, coaxial, or fiber-optic communication links or combinations thereof. Even though the interfaces 112 and 116 are depicted as bi-directional interfaces, one of skill in art can appreciate that the interfaces 112 and 116 may be implemented with uni-directional interfaces that use a uni-directional communication protocol, for example, the Wiegand protocol.

As can be appreciated by one of skill in the art, the interfaces 112 and 116 may be implemented utilizing buses or other types of connections. For example, the I/O ports may be one or more of a USB port, parallel port, serial port, Small Computer Systems Interface (SCSI) port, modem, Ethernet, and/or an RF interface. The protocols used to communicate between the host computer 110 and the readers 120 may include one or more of the TCP/IP protocol, RS 232, RS 485, Current Loop, Power of Ethernet (POE), Bluetooth, Zigbee, GSM, WiFi, and other communication methods and protocols known in the art.

Bi-directional RF interfaces 125 between a reader 120 and a RFID 130 are automatically established when the RFID is placed in an active zone (not shown) of the interrogating reader (RF interface $125_1$ between the reader $120_1$ and RFID $130_2$ is illustratively shown). Herein the active zone of the reader 120 is defined as a three dimensional space where intensity of RF signals emitted by the reader exceeds a threshold of sensitivity of the RFID 130 and intensity of RF signals emitted by the RFID 130 exceeds a threshold of sensitivity of the reader 120.

The host computer 110 may be a general-purpose computer adapted for multi-task data processing and suitable for use in an industrial setting. A memory of the host computer 110 comprises software program(s) containing at least one of a database of records associated with the readers 120, the RFIDs 130 and their respective holders or users, algorithms (s) for acquiring, decoding, verifying, and modifying data contained in the RFIDs 130, algorithm(s) for testing authenticity and validity of the RFIDs 130, and algorithm(s) for implementing the results of these tests. Specific configuration of the host computer 110 is determined based on and compliant with computing and interfacing capabilities of the readers 120. Hereafter, in reference to an individual or an object associated with the RFID 130, the terms a "holder" and a "user" are used interchangeably.

Each reader 120 is adapted for exchanging information with the host computer 110 and for requesting data from the RFID 130 placed in the active zone of the reader. The reader 120 may also be adapted for processing at least a portion of the data acquired from the RFID 130. Alternatively, processing of the acquired data may be performed using the host computer 110. In one embodiment, the reader 120 generates signals facilitating execution of the results of interrogating the RFID (e.g., engages/disengages a locking mechanism, allows/disallows movement of a monitored article, temporarily disables itself, activates an alarm system, and the like). Alternatively, the host computer 110 may generate such signals.

In accordance with embodiments of the present invention, a stand-alone reader 120, which includes the functionality of both the reader 120 and the host computer 110, may be utilized. This stand-alone reader may include, or have access to, the database that contains data used to determine the authenticity of an RFID device and/or algorithm(s) used to make the determination of authenticity of the RFID device. A determination of authenticity for an RFID device is made at the receiving point rather than having to transmit data across a network from the reader to a host computer 110/control panel in order to make a determination of authenticity. The stand-alone reader is further operable to execute instructions based upon the analysis of the RFID device.

Figure 2:
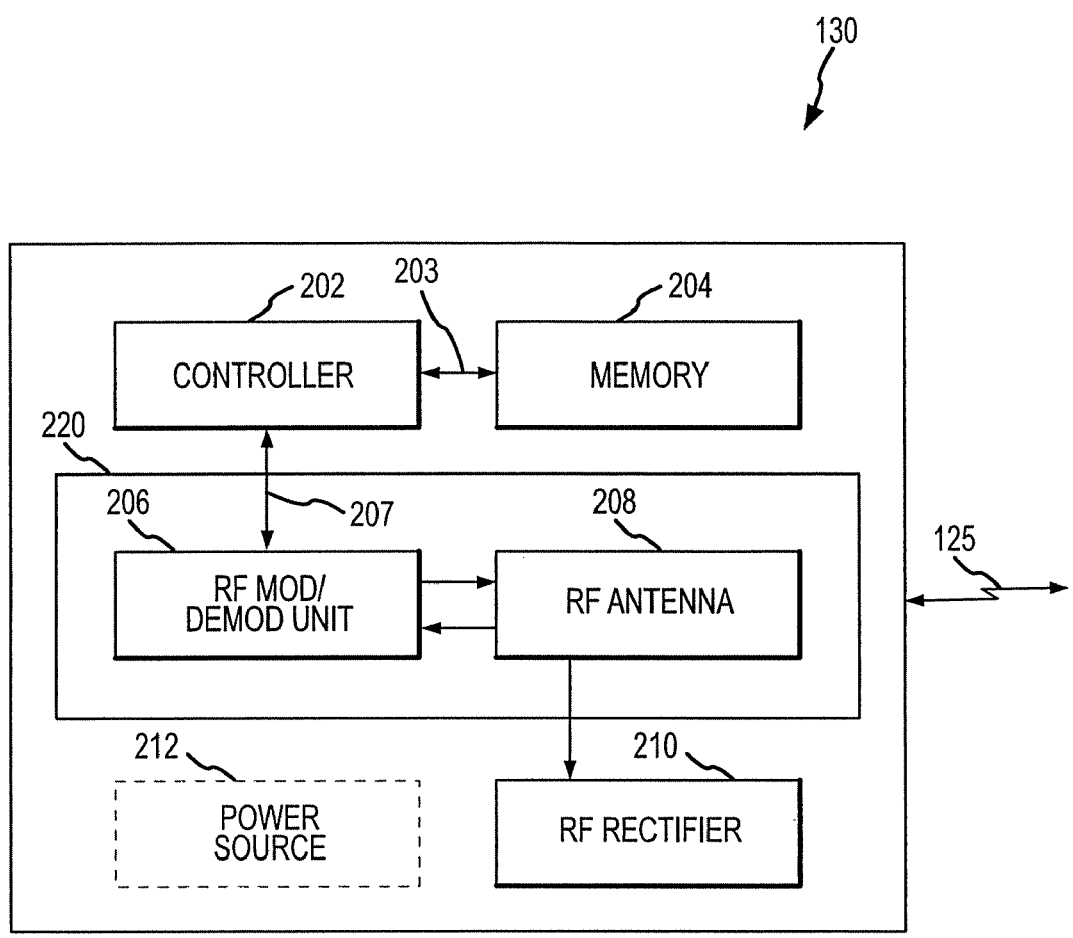
FIG. 2 depicts a high-level, exemplary schematic diagram of a RFID of the system of FIG. 1.

FIG. 2 depicts a high-level, exemplary schematic diagram of the RFID 130 in accordance with one embodiment of the present invention. In the depicted embodiment, the RFID 130 illustratively comprises a controller 202, a memory 204, a RF receiver/transmitter 220 including a RF modulator/demodulator unit (MDU) 206 and a RF antenna 208, an optional RF rectifier 210, and/or an optional power supply 212. The controller 202 (e.g., application specific integrated circuit (ASIC), microprocessor, programmable controller, and the like) uses bi-directional interfaces 203 and 207 to the memory 204 and MDU 206, respectively, to facilitate data exchanges in the RFID 130 and wireless communications with an interrogating reader (e.g., reader $120_2$ of FIG. 1). In an alternate embodiment (not shown), at least portions of the MDU 206 may be incorporated in the controller 202.

The RFID 130 may be fabricated as a system-on-chip (SoC) device, a system-in-package (SiP) device, or a system in-module (SiM) device. In the SoC device, various functional components are integrated onto a single die. Accordingly, in SiP and SiM devices, several SoC devices are combined in a single package (SiP device) or an assembly including SoC and/or SiP devices (SiM device), respectively.

A "passive" RFID 130 uses RF signals (i.e., RF radiation) emitted by the reader 120 as a source of energy for powering the RFID. When a passive RFID comes within range of an interrogating, the reader provides power to the RFID via a querying RF signal. The passive RFID 130 comprises the RF rectifier 210 (as shown in FIG. 2) converting a portion of RF power collected by the antenna 208 in the DC power facilitating operability of the RFID. Such a RFID can operate only in the active zone of an interrogating reader and is inactive otherwise.

Alternatively, the RFID 130 may comprise an internal (i.e., on-board) power source 212, e.g., one or several batteries and/or solar cells ("active" RFID). In yet another embodiment, the RFID 130 comprises both the RF rectifier 210 and the power source 212 ("semi-active" RFID). Active and semi-active RFIDs can typically be used at greater distances from the readers than the passive ones, as well may be provided with additional computing and/or sensing capabilities.

In operation, the reader 120 and RFID 130 use pre-programmed communication protocols. To increase probability of error-free reception, the same messages may redundantly be repeated a pre-determined number of times or during a pre-determined time interval. The interrogating reader 120 generates an interrogating RF signal. The interrogating RF signal of the interrogating reader 120 (or, in passive or semi-passive RFIDs, a portion of that signal) is received by the RFID antenna 208 and is forwarded to the MDU 206 that demodulates the RF signal and provides the demodulated signal for processing to the controller 202. When the received RF signal contains a request for data identifying the RFID 130 and/or a holder of the RFID, the controller accesses the memory 204 for this data and, via the MDU 206 and antenna 208, transfers the requested data to the reader 120.

Figure 3:
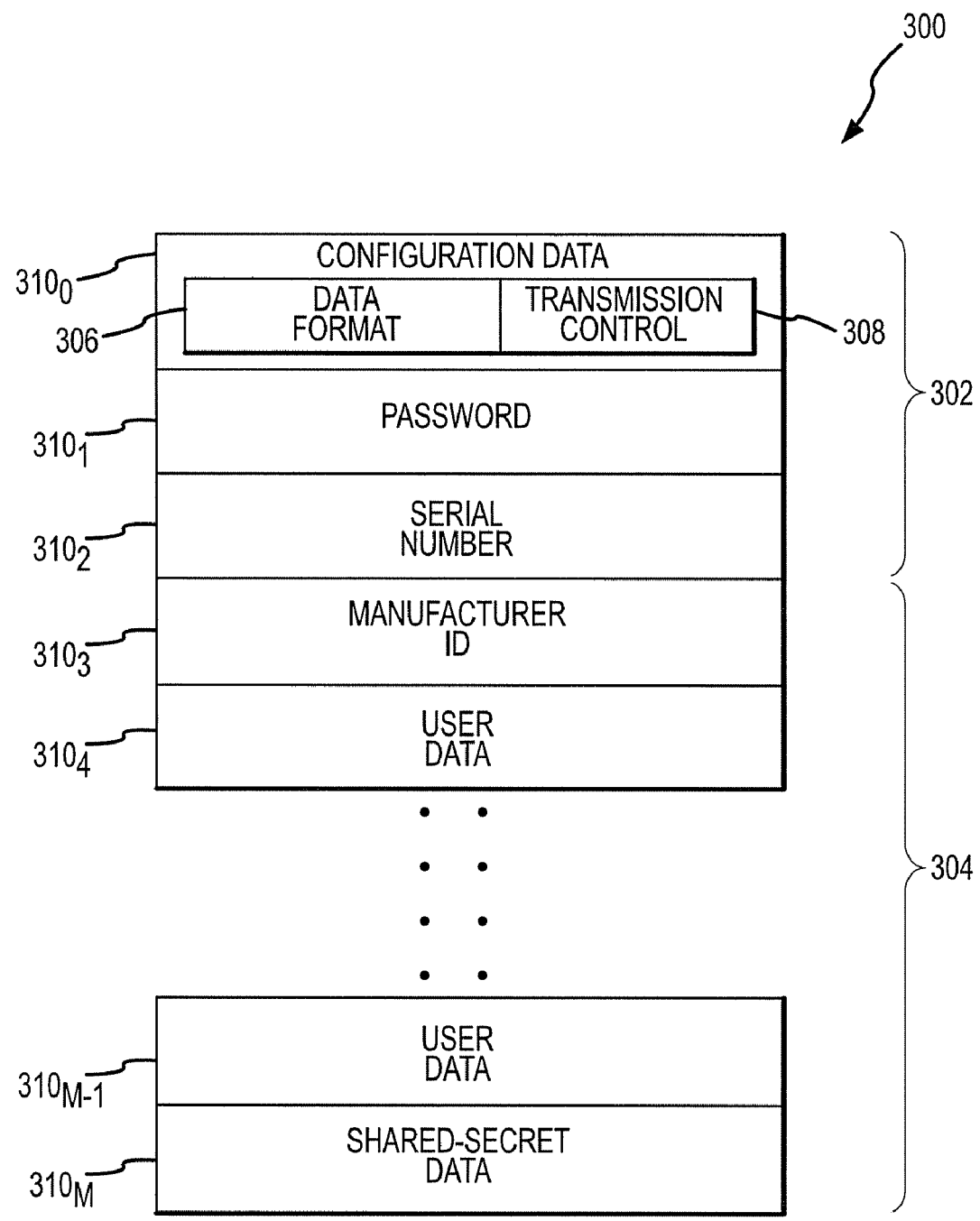
FIG. 3 depicts an exemplary memory map of a RFID of FIG. 1 in accordance with one embodiment of the present invention.
Figure 4:
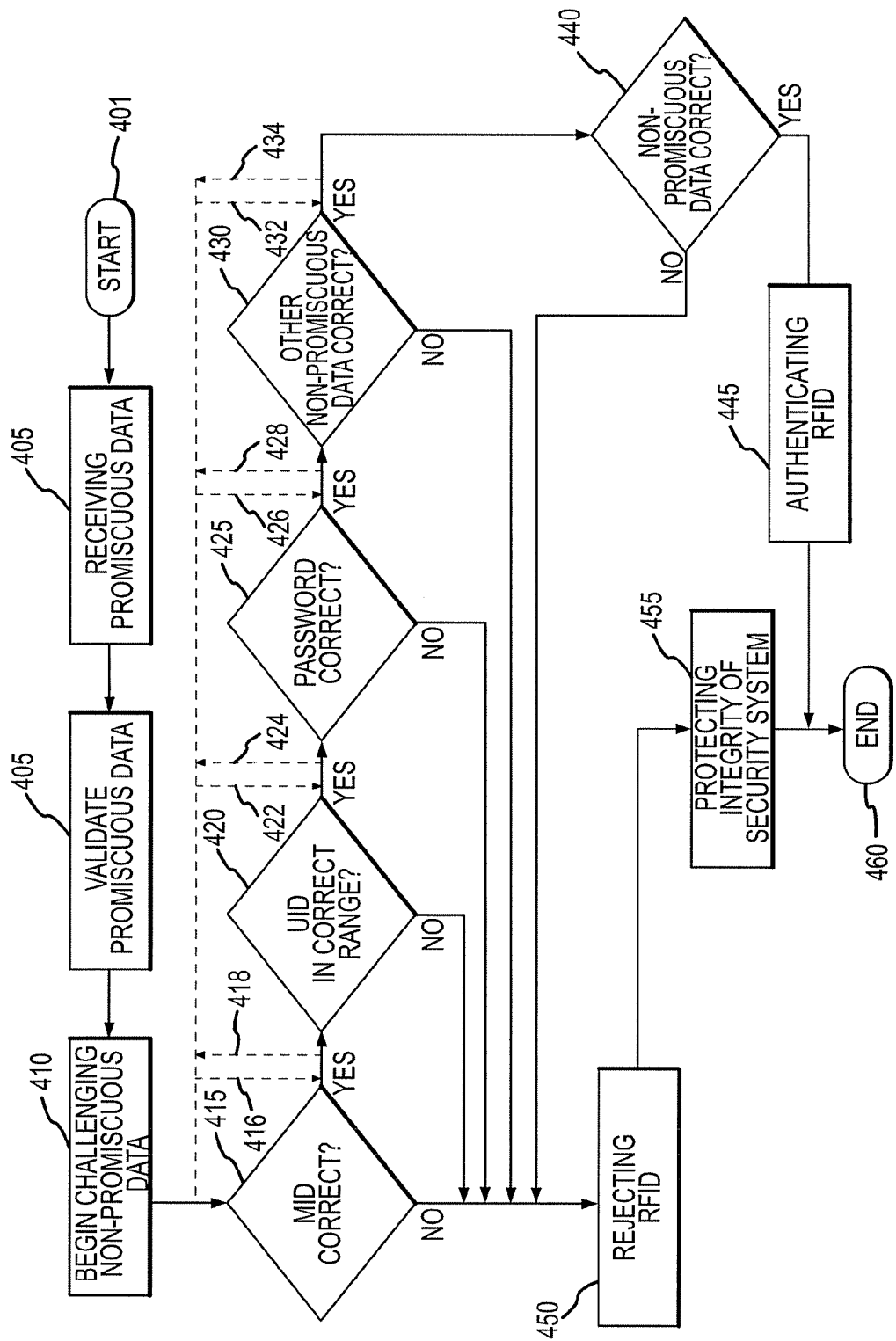
FIG. 4 depicts a flow diagram illustrating a method for authenticating RFIDs using the system of FIG. 1 in accordance with one embodiment of the present invention.

The memory 204 comprises a promiscuous region 302 and a non-promiscuous region 304 and contains configuration and authenticating data of the RFID 130, and holder-specific data, which are selectively stored in the regions 302 and 304 of the memory in a form of data segments 310 (discussed in detail in reference to FIGS. 3-4). Specifically, a card manufacturer may choose to load a particular type of data on the promiscuous memory region 302 and another type of data on the non-promiscuous memory region 304. A system operator may selectively change where these types of data are located on the RFID 130.

Holder specific data or credential data includes, but is not limited to, name, birth date, social security numbers, title, position held in the company, access rights of the holder, employee badge number, and the like. Data stored in the promiscuous region 302 ("promiscuous data") is automatically transmitted to the interrogating reader 120 when the controller 202 detects a querying RF signal of the reader (i.e., when the RFID 130 is disposed in the active zone of that reader). Data stored in the non-promiscuous region 304 ("non-promiscuous data") is selectively transmitted to the interrogating reader upon an additional request from the reader, typically in the form of a challenge. Initiation and execution of such a request require successful decoding and validation of the promiscuous data, possibly including authentication data, by the interrogating reader 120 and/or the host computer 110.

The memory 204 of a passive RFID generally comprises at least one array of non-volatile memory cells, e.g., Erasable Programmable Read Only Memory (EPROM) cells or FLASH memory cells, among other types of non-volatile memory cells. The memory 204 of an active RFID having a battery or similar powers source may additionally comprise at least one array of dynamic random access memory (DRAM) cells. A content of at least a portion of the memory 204 may be pre-programmed and write-protected thereafter, whereas the content of other portions of the memory may selectively be modified or erased using the reader 120.

FIG. 3 depicts an exemplary memory map 300 of the memory 204 in accordance with one embodiment of the present invention. In the depicted embodiment, the memory map 300 comprises a plurality of M data segments (or "words") 310 each having a pre-determined bit length, wherein M is an integer and $M \geq 2$.

Illustratively, a data segment $310_0$ contains configuration data of the memory map 300, data segments $310_1$, $310_2$, and $310_3$ contain a password, a unique ID (UID) of the RFID 130, and a manufacturer ID (MID) of the RFID 130, respectively, and data segments $310_4$-$310_M$ contain user/holder data.

In one embodiment, the UID is a serial number (SN) of the RFID 130, the MID is a number or name assigned to a group of RFIDs (e.g., RFIDs fabricated for the same customer, RFIDs fabricated for use within certain area, and the like), and the user data is user credential such as user name, employee badge number, and the like. In an alternate embodiment, at least one of the data segments $310_1$, $310_2$, or $310_3$ may contain the user data. At least a portion of the data segments $310_1$-$310_3$ and one or more adjacent data segments $310_4$-$310_M$ may be associated with the promiscuous region 302 of the memory 204, whereas the remaining data segments 310 are associated with the non-promiscuous region 304 of the memory. In the depicted embodiment, the data segment $310_0$ illustratively belongs to the promiscuous region 302. Alternatively, the data segment $310_0$ may be a portion of the non-promiscuous region 304.

In the RFID 130, the data segment $310_0$ comprises a data format block 306 and a transmission control block 308. The data format block 306 contains information-describing organization of the memory 204 (e.g., size of the memory, a number and bit lengths of the data segments, and the like). The transmission control block 308 contains a code identifying the data segments associated with the promiscuous region 302. In one exemplary embodiment, a numeric value of the code (i.e., a max block code) corresponds to a number of data segments adjacent to the data segment $310_0$. For example, when the numeric value of the code is 4, the promiscuous region 302 includes the data segments $310_0$-$310_3$, while the non-promiscuous region 304 comprises the data segments $310_4$-$310_M$.

In one embodiment, the promiscuous region 302 includes at least the data segments containing the password, the UID, and the MID and may include one or more data segments containing a portion of the user data, site codes, and other data that can be used to verify authenticity in a legacy system. Correspondingly, the non-promiscuous region 304 comprises data segments containing, partially or in full, the user data, and other shared-secret data. In one embodiment, however, some shared-secret data may be included in the promiscuous region 302 if such shared-secret data is intended for use in legacy systems.

During programming the RFID 130, a content of at least a portion of the data segments 310 may be encrypted for transmission. Using a pre-determined algorithm, an encryption key may be encoded in a specific data segment 310 or a group of the data segments disposed in the promiscuous region 302 of the memory 204. Alternatively, the encryption key or an algorithm for deriving the encryption key from the data received from the RFID 130 may be contained in the reader 120 or the host computer 110.

FIG. 4 depicts a flow diagram illustrating a method for authenticating the RFIDs 130 using the system of FIG. 1 in accordance with one embodiment of the present invention. In some embodiments, processing steps of the method are performed in the depicted order. In alternate embodiments, at least two of these steps may be performed contemporaneously or in a different order. To best understand the invention, the reader should simultaneously refer to FIGS. 1 and 3-4. Furthermore, the discussion of FIG. 4 assumes that the RFID being presented to the reader contains both promiscuous and non-promiscuous data. However, as can be appreciated by one of skill in the art, the RFID may contain only promiscuous data or only non-promiscuous data. The reader may be capable of retrieving and authenticating promiscuous and/or non-promiscuous data. The system is designed such that the readers are compatible with legacy RFIDs having only promiscuous data and newer more secure RFIDs that have non-promiscuous data, promiscuous data, and combinations thereof.

The method starts at step 401 and proceeds to step 405, where an interrogating reader 120 (e.g., reader 120, of FIG. 1) receives a data stream from the RFID 130 (e.g., RFID $130_2$ of FIG. 1), which entered an active zone of the reader. The received data stream comprises a sequence of repetitive messages each containing a content of the data segments associated with the promiscuous region 302 of the memory 204 of that RFID. The reader accumulates a statistically significant number of the messages (e.g., 3-10 or more) to facilitate an error-free interpretation of the received data. Using computing capabilities of the reader 120 and/or the host computer 110, portions corresponding to the MID, the UID, the password (or other shared-secrets), and the user data are separated from one another, and contents of individual data segments are recognized. When the messages are encrypted, using the encryption key located in the respective data segment(s), the reader 120 or the host computer 110 decode the encrypted data (e.g., MID, UID, password, and a portion of user data), as discussed above in reference to FIG. 3 prior to analyzing the received data.

Upon completion of step 405, the method performs validity testing of the received promiscuous data in step 408. Once the promiscuous data 302 has been validated, the reader 120 may begin initiating challenges to the RFID 130 in order to authenticate the non-promiscuous data of the RFID 130 as discussed below in reference to decision steps 415, 420, 425, and 430. Of course, in some embodiments where a legacy reader 120 is employed, the promiscuous data may be the only data read and analyzed to determine RFID authenticity. In alternative embodiment, newer readers may be employed that can issue challenges to RFID devices to verify the authenticity of the RFID device. Thus, the RFID device 130 may be backwards compatible with legacy readers as well as functional with newer readers.

Non-provisional data testing is performed by the reader 120 first initiating a challenge to the RFID 130 related to one or more data segments within the non-promiscuous memory region 304. In response to the challenge, the RFID 130 transmits only the requested data segments to the reader 120 for comparing security elements in the decoded data with the records stored in or otherwise available to the interrogating reader 120 or the host computer 110.

A challenge may simply be the reader 120 querying the RFID 130 for a particular item of information. In order to correctly reply to the challenge, the RFID 130 must send the requested information to the reader 120. A challenge may also include the reader 120 requiring the RFID to respond using a particular protocol (i.e., proper encoding, encryption, frequency, etc.)

At step 410, the interrogating reader 120 interactively communicates to the RFID 130. Specifically, the reader 120 requests and receives from the RFID 130 a content of one or more randomly selected data segments 310 associated with the non-promiscuous region 304 of the memory 204 of the RFID. For the request to be accepted and executed by the RFID 130, the reader transmits to the RFID a pre-determined message. In one embodiment, such a message comprises identifiers of the requested data segments. In an alternate embodiment, the message may include an alpha-numeric sequence generated using a predetermined algorithm and at least one validated credential received from the promiscuous memory region 302.

To address requirements of specific applications and functional limitations of the legacy readers 120, the RFIDs 130 may be pre-programmed using a variety of security schemes. In particular, one or more security elements, such as the MID, the UID, site code, shared-secret data, the password, or a specific portion of the user data may be absent in the received data stream, however, the data stream always comprises at least one of these security elements. The method selectively skips a challenge/query examining the validity of that parameter, as illustratively shown in FIG. 4 using optional links 416 and 418, 422 and 424, 426 and 428, and 432 and 434 depending on the credentials that are required to gain access to a particular asset.

For example, the reader may not need the MID in order to allow access to an individual, but the UID is a credential associated the non-promiscuous memory that must be challenged and verified by the reader. When the MID data is not required, but the UID data is required, the method after step 410 proceeds to step 420 (link 416), thus skipping step 415. Correspondingly, if a challenge of step 420 is affirmatively responded to and the password data is not required, the method after step 420 proceeds to step 430 (links 424 and 426), thus skipping step 425. Herein, for purposes of completeness, we assume that the MID, UID, password, and a portion of the user data are a required credential that must be challenged by the reader 120 before access is granted to a given asset.

At step 415, the method queries if the MID provided by the RFID 130 being interrogated is correct (i.e., matches the records). If the query of step 415 is negatively answered, the method proceeds to step 450 where the RFID is rejected and the holder is denied the requested privileges (e.g., right of access to or exit from an area protected by a mechanism controlled by the reader or the host computer). If the query of step 415 is affirmatively answered, the method proceeds to step 420.

At step 420, the method queries if the UID provided by the RFID 130 being interrogated is correct. When the UID is a serial number, the method may, for example, verify that the provided serial number belongs to a pre-selected range assigned to the serial numbers. If the query of step 420 is negatively answered, the method proceeds to step 450. If the query of step 420 is affirmatively answered, the method proceeds to step 425.

At step 425, the method queries if the password provided by the RFID 130 being interrogated is correct (e.g., predetermined alpha-numeric sequence, result of solving a pre-defined logical or mathematical equation, and the like). If the query of step 425 is negatively answered, the method proceeds to step 450. If the query of step 425 is affirmatively answered, the method proceeds to step 440.

At step 440, the method queries if a content of the received non-promiscuous data segments matches the records. If the query of step 440 is negatively answered, the method proceeds to step 450. If the query of step 440 is affirmatively answered, the method proceeds to step 445.

At step 445, the interrogating reader 120 (or host computer 110) authenticates the RFID 130 being interrogated and provides a holder of the RFID with privileges listed in the RFID or records stored in or otherwise available to the reader 120 or the host computer 110.

At step 450, the RFID 130 that failed at least one of the validity tests discussed above in reference to steps 415, 420, 425, 430, and 440 is rejected as invalid and, as such, a holder of the RFID is denied any privileges the holder of an authenticated RFID could be entitled to.

At step 455, to protect integrity of the system 100, the reader 120 or the host computer 110 analyses a number and pattern of events associated with interrogation of invalid RFIDs. In one embodiment, the host computer disables the reader 120 or otherwise terminates authentication of the RFIDs 130 by the reader for a pre-determined duration of time or permanently and/or generates a corresponding alarm signal when at least one of the following events is detected: (a) a number of invalid RFIDs interrogated during a specific time interval exceeds a first pre-determined threshold, (b) a number of consecutively interrogated invalid RFIDs exceeds a second pre-determined threshold, (c) a number of repetitive interrogations of the same invalid RFID(s) exceeds a third pre-determined threshold, (d) an attempt to extract or erase at least one secret pre-programmed in the reader, or (e) an attempt to temper the reader mechanically or electronically, including an attempt to temper software of the reader. In an alternate embodiment, at least a portion of these measures may be performed by the reader. In another embodiment, using the interrogating reader 120, a content of one or more data segments 410 in an invalid RFID may selectively be modified or erased to prevent further attempts to authenticate that RFID. In one embodiment, after being disabled, the reader may be re-enabled using at least one of the host computer, a built-in keypad, or a pre-programmed transferable device, said device using a means of electrical, magnetic, optical, or radio frequency coupling to the reader.

At step 460, upon completion of step 445 or step 455, the method ends.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A radio frequency identification device (RFID), comprising:

a controller;

a RF receiver/transmitter adapted for wireless coupling to a RF interrogator; and a memory comprising a promiscuous region and a non-promiscuous region, wherein at least one of configuration data, shared-secret data, and holder data is stored as one or several data segments each selectively associated with at least one of the promiscuous region and the non-promiscuous region, wherein data from the promiscuous region is promiscuously transmitted by the RF receiver/transmitter to the RF interrogator when the RFID is disposed in an active zone of the reader.

2. The RFID of claim 1 wherein a content of at least one of the configuration data, an authenticating data, and the holder data is stored in a cryptographic format.

3. The RFID of claim 2 wherein an encryption key for the cryptographic format is encoded in a content of at least one data segment associated with the non-promiscuous region.

4. The RFID of claim 2 wherein an encryption key for the cryptographic format is stored in at least one of the reader and a host computer of a system comprising such readers.

5. The RFID of claim 1 wherein a number of the data segments selectively associated with the promiscuous region is encoded in the configuration data.

6. The RFID of claim 1 wherein each of the data segments has a selectively pre-determined bit length.

7. The RFID of claim 1 wherein a content of at least one of the data segments is stored in a read-only portion of the memory.

8. The RFID of claim 1 wherein a content of at least one of the data segments is stored in a read/write portion of the memory.

9. The RFID of claim 8 wherein the content may selectively be modified or erased using the reader.

10. The RFID of claim 1 wherein at least portions of the controller, the RF means, or the memory are implemented in a form of an integrated circuit.

11. The RFID of claim 1 wherein a holder is an individual and the holder data is credential data of the individual.

12. The RFID of claim 1 wherein a holder is an object identified using the RFID and the holder data is identification data of the object.

13. The RFID of claim 1 wherein said RFID is an access card, an ID card, a smart card, or an RF tag.

14. The RFID of claim 1 wherein said RFID is a device using as a source of energy at least one of radio frequency (RF) radiation of the reader or an internal source of energy.

15. The RFID of claim 1 wherein said RFID is a component of a system comprising a plurality of the RFIDs, a plurality of readers of the RFIDs, and a host computer administering the readers and containing records associated with the RFIDs holders of the RFIDs, and the readers.

16. A radio frequency identification device (RFID), comprising:

a controller;

a RF receiver/transmitter adapted for wireless coupling to a RF interrogator; and a memory comprising a promiscuous region and a non-promiscuous region wherein at least one of configuration data, shared-secret data and holder data is stored as one or several data segments each selectively associated with at least one of the promiscuous region and the non-promiscuous region, wherein the one or more of the data segments associated with the promiscuous region contain authentication data and a content of the data segments associated with the non-promiscuous region is transmitted to the reader by the RFID disposed in the active zone after the reader decodes and validates said authentication data.

17. The RFID of claim 16, wherein a content of data segments associated with the non-promiscuous region is transmitted after the reader transmits a challenge to the RFID.

18. The RFID of claim 17 wherein a password is encoded in the content of at least one of the data segments associated with the promiscuous region.

19. The RFID of claim 17 wherein at least one of a password and Wiegand data is stored in the reader or provided to the reader by a host computer of the reader.

20. A method for authenticating radio frequency identification devices (RFIDs), comprising:

(a) providing a system including:

a plurality of RFIDs each having a memory comprising a promiscuous region and a non-promiscuous region, wherein at least one of configuration data, shared-secret data, and holder data is stored a form of one or several data segments each associated with at least one of the promiscuous region and the non-promiscuous region; and at least one reader for reading and interrogating the RFIDs;

(b) receiving from an RFID, promiscuous data including a content of the data segments associated with the promiscuous region;

(c) verifying the promiscuous data;

(d) requesting from the RFID, non-promiscuous data including a content of at least one data segment associated with randomly selected data from the non-promiscuous region;

(e) receiving the at least one non-promiscuous data segment requested from the RFID;

(f) verifying the non-promiscuous data; and (g) accepting or rejecting the RFID based upon steps (c)-(f).

21. The method of claim 20 wherein at least one of the steps (c)-(g) is performed using the at least one reader interrogating the RFID.

22. The method of claim 20 wherein at least one of the steps (c)-(g) is performed using a host computer connected to the at least one reader.

23. The method of claim 20 wherein a holder comprises an individual and the holder data is holder's credential data.

24. The method of claim 20 wherein a holder comprises an object identified using the RFID and the holder data is object's identifying data.

25. The method of claim 20 wherein said RFID comprises at least one of an access card, a smart card, a cellular phone, a Personal Digital Assistant (PDA), and an RF tag.

26. The method of claim 20 wherein said RFID comprises a device using as a source of energy at least one of RF radiation of the reader or an internal source of energy.

27. The method of claim 20 wherein at least a portion of the promiscuous data or the non-promiscuous data is encrypted.

28. The method of claim 27 further comprising:

deriving an encryption key from the promiscuous data or obtaining the encryption key from the reader or the host computer; and decoding said at least a portion of the promiscuous data or the non-promiscuous data.

29. The method of claim 20 wherein the promiscuous data comprises at least one of a manufacturer ID of the RFID, a unique ID of the RFID and a password of the RFID.

30. The method of claim 29 wherein the promiscuous data further comprises a portion of the holder data.

31. The method of claim 29 wherein the unique ID is a serial number of the RFID.

32. The method of claim 31 wherein the step (c) further comprises:
verifying that the serial number is within a pre-determined range assigned to serial numbers.

33. The method of claim 29 wherein the step (c) further comprises:
decoding the password from the promiscuous data using an algorithm stored in the reader or the host computer.

34. The method of claim 20 wherein the step (h) further comprises:
modifying or erasing at least one of the promiscuous data, a manufacturer ID, an unique ID, a password, or the non-promiscuous data.

35. The method of claim 20 further comprising:
modifying or erasing at least a portion of the promiscuous data or the non-promiscuous data.

36. The method of claim 20 wherein the step (g) further comprises:
disabling the reader and/or rejecting the RFIDs for a pre-determined duration of time.

37. The method of claim 36, wherein disabling the reader and/or rejecting the RFIDs for a predetermined duration of time occurs when one or more of the following occurs:
i.) a number of invalid RFIDs interrogated during a specific time interval exceeds a first pre-determined threshold;
ii.) a number of consecutively interrogated invalid RFIDs exceeds a second pre-determined threshold;
iii.) a number of repetitive interrogations of the same invalid RFID(s) exceeds a third pre-determined threshold;
iv.) an attempt to extract or erase at least one secret pre-programmed in the reader; or
v.) an attempt to temper the reader mechanically or electronically, including an attempt to temper software of the reader.

38. A system for authenticating radio frequency identification devices (RFIDs), comprising:
at least one interrogator; and
at least one RFID comprising memory, wherein the memory comprises a promiscuous region and a non-promiscuous region, wherein at least one of configuration data, shared-secret data, and holder data is stored as one or several data segments each associated with at least one of the promiscuous region and the non-promiscuous region, wherein a content of the data segments associated with the promiscuous region is freely transmitted to the reader when the RFID is disposed within an active zone of the reader.

39. The system of claim 38 wherein said at least one interrogator is adapted to interrogate the at least one RFID using resources of or available to a host computer connected to the at least one interrogator.

40. The system of claim 38, wherein a content of at least one of the configuration data, the authenticating data, and the holder data is stored in a cryptographic format.

41. The system of claim 40, wherein an encryption key for the cryptographic format is encoded in a content of at least one data segment associated with the promiscuous region.

42. The system of claim 40, wherein an encryption key for the cryptographic format is stored in at least one of the interrogator and host computer.

43. A system for authenticating radio frequency identification devices (RFIDs), comprising:
at least one interrogator; and
at least one RFID comprising memory, wherein the memory comprises a promiscuous region and a non-promiscuous region, wherein at least one of configuration data, shared-secret data, and holder data is stored as one or several data segments each associated with at least one of the promiscuous region and the non-promiscuous region, wherein the one or more of the data segments associated with the promiscuous region contains authentication data and a content of the data segments associated with the non-promiscuous region is transmitted to the at least one interrogator by the RFID disposed in the active zone after the at least one interrogator decodes and validates said shared-secret data.

44. The system of claim 43, wherein a content of the data segments associated with the non-promiscuous region is transmitted after the reader transmits a challenge to the RFID.

45. The system of claim 44, wherein at least one of a password and Wiegand data is encoded in the content of at least one of the data segments associated with the promiscuous region.

46. A method of updating a security access system comprising one or more first radio frequency interrogation devices (readers) and one or more first radio frequency identification devices (RFIDs), the first readers only configured to communicate with the first RFIDs, the first RFIDs comprising a memory containing a promiscuous region, the method comprising,
(a) replacing some or all of the first RFIDs with second RFIDs, the second RFIDs having a promiscuous and a non-promiscuous region, and further comprising configuration data, shared-secret data or holder data stored in the form of one or multiple data segments each selectively associated with the promiscuous or non-promiscuous regions;
(b) replacing the first readers with second readers, the second readers configured to communicate with first RFIDs and second RFIDs;
(c) transmitting a content of data segments associated with the promiscuous region to a second reader when either a first RFID or a second RFID is present in the active zone of a second reader, and wherein said data segments contain authentication data;
(d) determining access rights of the first RFID with respect to a restricted asset;
(e) requesting at least a portion of the non-promiscuous data from the second RFID, including content of at least one randomly selected data segment from the non-promiscuous region;
(f) receiving the requested non-promiscuous data from the second RFID;
(g) determining access rights of the second RFID with respect to a restricted asset.

47. The method of claim 46, further comprising, denying access to the restricted asset to a holder of the first RFID in response to determining access rights of the first RFID do not match required access rights for said restricted asset.

48. The method of claim 46, further comprising, permitting access to the restricted asset to a holder of the RFID in response to determining access rights of the first RFID match required access rights for said restricted asset.

49. The method of claim 46, wherein at least one of said first and second RFID is an access card, a smart card, a cellular phone, a Personal Digital Assistant (PDA), or an RF tag.

50. The method of claim 46, wherein at least a portion of the promiscuous data on at least one of the first and second RFID is encrypted.

51. The method of claim 50, further comprising:
deriving an encryption key from the promiscuous data or obtaining the encryption key from the reader or a host computer;
for said second RFID, decoding said at least a portion of the promiscuous data or the non-promiscuous data; and
for said first RFID, decoding said at least a portion of the promiscuous data.

52. The method of claim 46, wherein the promiscuous data comprises at least one of a manufacturer ID of the RFID, a unique ID of the RFID, site code, and a password of the RFID.

53. The method of claim 52, wherein the promiscuous data further comprises a portion of the holder data.

54. The method of claim 52, wherein the unique ID is a serial number of the RFID.

55. The method of claim 54, wherein step (d) further comprises:
determining whether the serial number is within a predetermined range assigned to serial numbers.

56. A security access system, comprising:
(a) at least one first RFID, having first data in a promiscuous region;
(b) at least one second RFID having data in both a promiscuous data region and a non-promiscuous data region; and
(c) at least one first reader that operatively communicates with said at least one first and second RFIDs, wherein at least one of configuration data, shared-secret data, and holder data is stored as one or several data segments each associated with at least one of the promiscuous region and the non-promiscuous region of said at least one second RFID, and wherein at least one of configuration data, shared-secret data, and holder data is stored as one or several data segment associated with the promiscuous region of said at least one first RFID.

57. The system of claim 56, further comprising a host computer.

58. The system of claim 57, wherein said at least one first reader is adapted to interrogate said at least one of first and second RFIDs using resources of or available to the host computer.

59. The system of claim 57, wherein a content of at least one of the configuration data, the shared-secret data, and the holder data is stored in a cryptographic format.

60. The system of claim 59, wherein an encryption key for the cryptographic format is encoded in a content of at least one data segment associated with the promiscuous regions of said at least one first and second RFID.

61. The system of claim 59, wherein at least one of an encryption key for the cryptographic format and Wiegand data is stored in at least one of the at least one first reader and host computer.

62. The system of claim 56, wherein a content of the data segments associated with said promiscuous regions of said at least one of first and second RFIDs is transmitted to the reader when either or both of said first and second RFIDs is disposed within an active zone of the first reader.

63. The system of claim 56, wherein the one or more of the data segments associated with the promiscuous region contains authentication data and a content of the data segments associated with the non-promiscuous region of said at least one second RFID is transmitted to the at least one first reader disposed in the active zone after the at least one first reader decodes and validates said shared-secret data.

64. The system of claim 63, wherein a content of the data segments associated with the non-promiscuous region of said at least one second RFID is transmitted after the reader transmits a challenge to said at least one second RFID.

65. The system of claim 64, wherein at least one of a password and Wiegand data is encoded in the content of at least one of the data segments associated with the promiscuous regions of said at least one first and second RFID.

* * * * *